(12) United States Patent
Drittler et al.

(10) Patent No.: US 8,725,550 B2
(45) Date of Patent: May 13, 2014

(54) MANAGING PROCESS LOGS

(75) Inventors: Bernhard Drittler, Walldorf (DE); Jens-Christoph Nolte, Sandhausen (DE); Bernd Schmitt, Waldbronn (DE)

(73) Assignee: SAP AG, Walldorf (DE)

( * ) Notice: Subject to any disclaimer, the term of this patent is extended or adjusted under 35 U.S.C. 154(b) by 365 days.

(21) Appl. No.: 13/181,253

(22) Filed: Jul. 12, 2011

(65) Prior Publication Data

US 2013/0019006 A1    Jan. 17, 2013

(51) Int. Cl.
| | | |
|---|---|---|
| G06Q 10/00 | (2012.01) | |
| G06Q 10/10 | (2012.01) | |
| G06Q 10/06 | (2012.01) | |
| G06F 11/34 | (2006.01) | |
| H04L 12/58 | (2006.01) | |
| G06F 17/30 | (2006.01) | |

(52) U.S. Cl.
CPC ............ *G06Q 10/103* (2013.01); *G06Q 10/067* (2013.01); *G06F 11/3409* (2013.01); *G06Q 10/0633* (2013.01); *H04L 12/5825* (2013.01); *G06F 11/3476* (2013.01); *G06F 17/30566* (2013.01)
USPC ......... 705/7.27; 705/7.26; 709/204; 709/224; 709/227; 718/104

(58) Field of Classification Search
None
See application file for complete search history.

(56) References Cited

U.S. PATENT DOCUMENTS

| | | | |
|---|---|---|---|
| 6,349,238 B1 * | 2/2002 | Gabbita et al. ................ | 700/101 |
| 6,937,993 B1 * | 8/2005 | Gabbita et al. ............... | 705/7.22 |
| 7,272,626 B2 * | 9/2007 | Sahai et al. ................... | 709/201 |
| 7,290,147 B2 | 10/2007 | Bittner et al. | |
| 7,296,052 B2 | 11/2007 | Heymann et al. | |
| 7,308,676 B2 | 12/2007 | Kusterer et al. | |
| 7,308,704 B2 | 12/2007 | Vogel et al. | |
| 7,350,209 B2 * | 3/2008 | Shum ........................... | 718/104 |
| 7,350,237 B2 | 3/2008 | Vogel et al. | |
| 7,441,239 B2 | 10/2008 | Bittner et al. | |
| 7,469,255 B2 | 12/2008 | Kusterer et al. | |
| 7,607,137 B2 | 10/2009 | Hauser et al. | |
| 7,647,558 B2 | 1/2010 | Ucar et al. | |
| 7,657,528 B2 | 2/2010 | Bittner et al. | |
| 7,890,937 B2 * | 2/2011 | Thormaehlen ................ | 717/136 |
| 8,204,809 B1 * | 6/2012 | Wise ............................... | 705/35 |
| 8,219,541 B2 * | 7/2012 | Magnuson et al. ........... | 707/708 |
| 2001/0039570 A1 * | 11/2001 | Stewart et al. ................ | 709/205 |
| 2002/0010741 A1 * | 1/2002 | Stewart et al. ................ | 709/204 |

(Continued)

OTHER PUBLICATIONS

Dayal, Umeshwar, Meichun Hsu, and Rivka Ladin. "Business Process Coordination: State of the Art, Trends, and Open Issues." VLDB. vol. 1. 2001.*

(Continued)

*Primary Examiner* — Gurkanwaljit Singh
(74) *Attorney, Agent, or Firm* — Fish & Richardson P.C.

(57) ABSTRACT

Systems, methods and techniques relating to managing process logs are described. A described technique includes identifying an end-to-end business process from a first system; identifying a plurality of systems that execute at least a portion of the end-to-end business process based on a definition of the end-to-end business process within the process registry; identifying a plurality of local process logs associated with the end-to-end business process for the a plurality of systems as defined by the process registry; and generating a federated process log based on at least a portion of each of the a plurality of local process logs.

17 Claims, 5 Drawing Sheets

(56) References Cited

U.S. PATENT DOCUMENTS

| | | | |
|---|---|---|---|
| 2002/0040304 A1* | 4/2002 | Shenoy et al. | 705/1 |
| 2003/0009507 A1* | 1/2003 | Shum | 709/104 |
| 2003/0009545 A1* | 1/2003 | Sahai et al. | 709/223 |
| 2003/0167299 A1 | 9/2003 | Heymann et al. | |
| 2003/0225781 A1 | 12/2003 | Kusterer et al. | |
| 2003/0225925 A1 | 12/2003 | Kusterer et al. | |
| 2003/0226103 A1 | 12/2003 | Hayer et al. | |
| 2003/0237044 A1 | 12/2003 | Hayer et al. | |
| 2004/0139087 A1 | 7/2004 | Bittner et al. | |
| 2004/0162741 A1* | 8/2004 | Flaxer et al. | 705/7 |
| 2004/0187114 A1 | 9/2004 | Bittner et al. | |
| 2004/0193699 A1 | 9/2004 | Heymann et al. | |
| 2004/0205039 A1 | 10/2004 | Bittner et al. | |
| 2005/0288945 A1 | 12/2005 | Melamed et al. | |
| 2006/0015867 A1 | 1/2006 | Drittler et al. | |
| 2008/0086348 A1* | 4/2008 | Rao et al. | 705/7 |
| 2008/0301275 A1* | 12/2008 | Barry | 709/223 |
| 2009/0132813 A1* | 5/2009 | Schibuk | 713/158 |
| 2010/0070395 A1 | 3/2010 | Elkeles et al. | |
| 2011/0099158 A1* | 4/2011 | Magnuson et al. | 707/708 |
| 2012/0016713 A1* | 1/2012 | Wilcock et al. | 705/7.27 |
| 2012/0095585 A1* | 4/2012 | Agarwal et al. | 700/109 |
| 2012/0095925 A1* | 4/2012 | Agarwal et al. | 705/301 |
| 2012/0215583 A1* | 8/2012 | Kunti et al. | 705/7.27 |

OTHER PUBLICATIONS

Jung, Jisoo, Injun Choi, and Minseok Song. "An integration architecture for knowledge management systems and business process management systems." Computers in Industry 58.1 (2007): 21-34.*

Ardagna, Danilo, and Barbara Pernici. "Adaptive service composition in flexible processes." Software Engineering, IEEE Transactions on 33.6 (2007): 369-384.* van der Aalst, Wil MP. "Business alignment: using process mining as a tool for Delta analysis and conformance testing." Requirements Engineering 10.3 (2005): 198-211.*

Yu, Tao, and Kwei-Jay Lin. "Service selection algorithms for Web services with end-to-end QoS constraints." Information Systems and E-Business Management 3.2 (2005): 103-126.*

U.S. Appl. No. 10/472,243, filed Apr. 29, 2004, Bittner et al.

U.S. Appl. No. 10/472,249, filed May 5, 2004, Bittner et al.

* cited by examiner

MANAGING PROCESS LOGS

TECHNICAL FIELD

The present disclosure relates to managing process logs.

BACKGROUND

An end-to-end business process may include multiple local processes executed across different business systems and/or by applications of different types or with different functionalities. The execution of the end-to-end business process may take place as workflow and/or built-in process that executes the implemented business logic of the underlying application. Each of the local processes may generate a process log that stores information for monitoring the execution of the particular local process. When the process log is generated by each individual business process, it may typically be stored in the system where the business process is executed at and/or associated with the particular business process type.

SUMMARY

This disclosure provides various implementations of systems, software and methods for managing business process logs. A first local process log of a first business process executing locally at a first system is identified, the first business process includes a first portion of an end-to-end business process associated with at least two business processes. A process registry is accessed to identify a second system executing a second business process associated with the end-to-end business process. A second local process log of the second business process executing locally at the second system is identified, the second business process includes a second portion of the end-to-end business process. A federated end-to-end process log is generated based on a combination of at least a portion of the identified first local process log and at least a portion of the identified second local process log.

While generally described as computer program product that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A business process (or business method) may be a sequence of related, structured activities and/or tasks that produce a specific service or product to serve a particular goal for one or more business customers. The business process may be implemented by computer program product(s) executed on one or more business systems. A business system may be any logical system that performs one or more business-related tasks. During the execution of the business process, a process log of the business process may be generated. The process log may include information descriptive of one or more aspects of the business process, and may be used for monitoring at least the execution of the business process.

In some instances, more than one local business process may be combined to form an end-to-end (E2E) business process (or a business process chain). More than one local business process may be implemented by different business applications, and/or executed on different business systems. Each business process may be associated with a process definition that defines concepts, relationships, semantics, and so forth, associated with elements of the particular business process. The process definition may also define an identification (e.g., a type code) and/or one or more integration points associated with the particular business process. Local business processes included in the same E2E business process may have the same identification and/or matching integration points. The process definition that includes the identification may be stored in a process registry communicably coupled to one or more systems executing the more than one local business process. In some instances, only parts or a subset of the process definition may be stored in the process registry, as opposed to the complete process definition.

Process logs generated by different local business processes included in an E2E business process may be orchestrated to generate a federated E2E process log. In some implementations, the process of federating process logs of an E2E business process may start from a local context, where a log federation related computer program product may execute instructions to identify a first business process log of a first business process executing locally at a first business system. The computer program product may then execute instructions to access a process registry to identify a second system executing a second business process associated with the E2E business process. In some instances, the association between the second business process and the E2E business process may be determined based on an identification of one or more integration points of the second business process that is the same as the identification of the first business process. The computer program product may further execute instructions to identify a second local process log of the second business process executing locally at the second system. The computer program product may execute instructions to repeat the process until it identifies a certain number of process logs that need to be federated. A federated E2E process log may then be generated based on the identified process logs. In some implementations, the process of federating process logs of an E2E business process may start from a central context, where a log federation computer program product may execute instructions to identify an E2E business process based on information stored in a process registry. The computer program product may then execute instructions to identify a plurality of systems communicably coupled to the registry, and execute at least a portion of the E2E business process. The computer program product may further execute instructions to identify a plurality of local process logs associated with the E2E business process for the identified plurality of systems. A federated E2E process log may then be generated based on the identified local process logs. Although described as a business process executed on business systems, the different implementations disclosed in the present application can be applied to any suitable logical process and/or systems.

Figure 1:
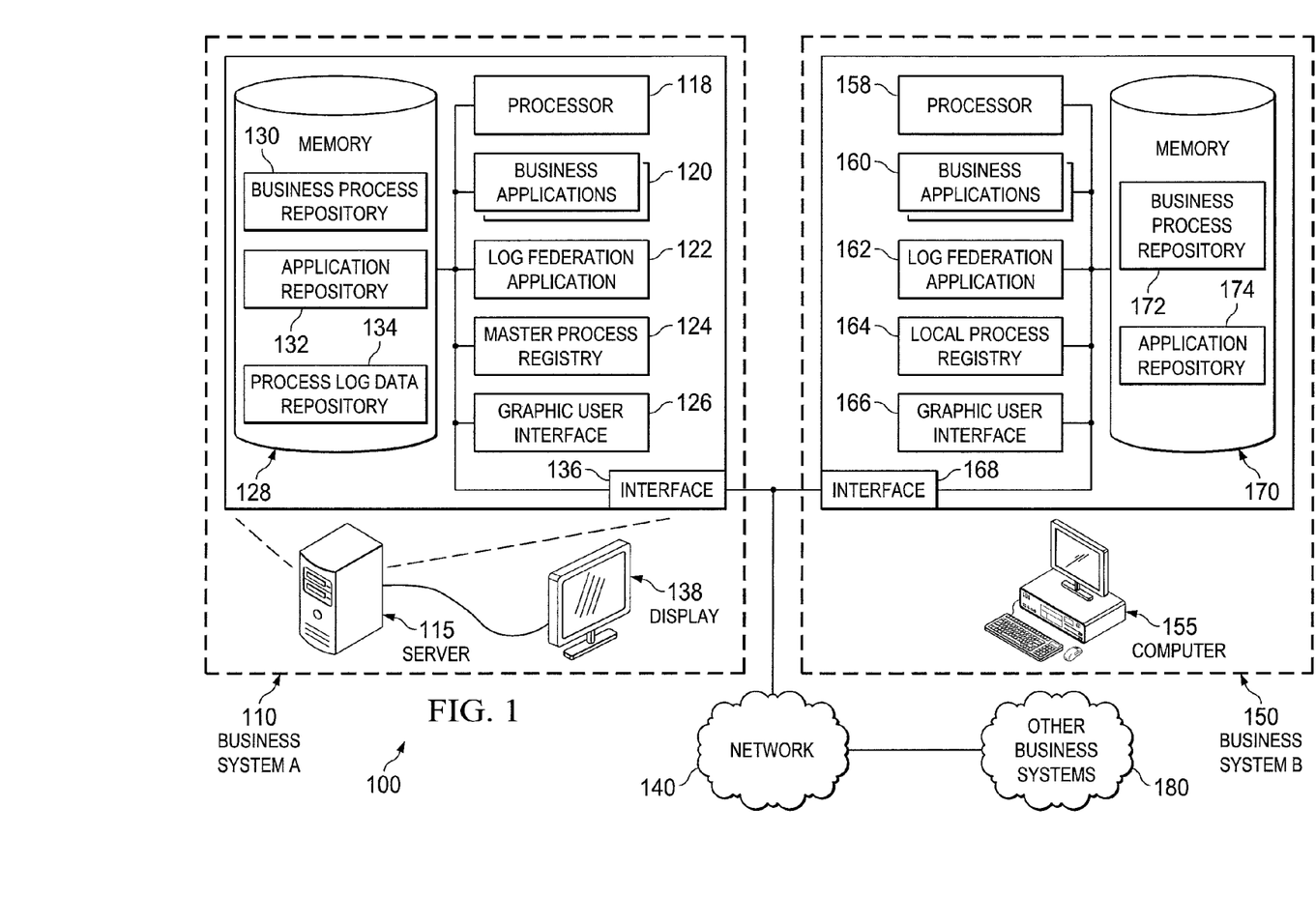
FIG. 1 is a schematic representation of an example system environment for managing process logs.

FIG. 1 is a schematic representation of an example system environment 100 for managing process logs. At a high level, the example system environment 100 includes or is communicably coupled with business system A 110, business system B 150 and other business systems 180, at least some of which communicate across a network 140. Example components of business system A 110 include at least a server 115 and a display 138. Example components of business system B 150 include at least a computer 155. In some implementations, server 115 and computer 155 may be interchangeably used to perform functionalities of a business system.

In the example 100 illustrated in FIG. 1, business system A 110 includes a server 115. The server 115 can accommodate hardware and/or software components including a processor 118, one or more business applications 120, a log federation application 122, a master process registry 124 and a graphic user interface (GUI) 126, a memory 128 and an interface 136. In general, the server 115 can be any server that stores one or more hosted and/or client business applications 120 that may be used to execute at least a portion of an E2E business process. In some instances, the server 115 may store a plurality of different business applications 120 (or instances thereof), while in other instances, the server 115 may be a dedicated server meant to store and execute only a single business application 120. At a high level, the server 115 comprises an electronic computing device operable to receive, transmit, process, store, or manage data and information associated with the environment 100. Specifically, the server 115 illustrated in FIG. 1 may be responsible for receiving business requests from one or more client applications associated with one or more external business customers communicably coupled to or operating in the example environment 100 and responding to the received requests by processing said requests in the associated business applications 120, and sending the appropriate response back to the requesting client applications. In addition to requests from the external business customers, requests may also be sent from internal users, or third-party customers, other automated applications, as well as any other appropriate entities, individuals, systems, or computers. As used in the present disclosure, the term "computer" is intended to encompass any suitable processing device. Although FIG. 1 illustrates a single server 115, a business system can be implemented using two or more servers 115, as well as computers other than servers, including a server pool. Indeed, server 115 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 115 may be adapted to execute any operating system, including Linux, UNIX, Windows, Mac OS, or any other suitable operating system.

The processor 118 included in the server 115 executes one or more business applications 120 and a log federation application 122 for business system A 110. Although illustrated as a single processor 118 in FIG. 1, two or more processors may be used according to particular needs, desires, or particular implementations of the environment. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 115 and, specifically, the one or more plurality of business applications 120. The processor 118 also executes the functionality required to receive and respond to requests from business customers, and/or their respective client applications, as well as the functionality required to perform the other operations of business system A 110. Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate. Aspects of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors 118 suitable for the execution of a computer program include, by way of example, both general and special purpose microprocessors, and any one or more processors of any kind of digital computer. Generally, a processor 118 will receive instructions and data from a read only memory or a random access memory or both. The essential elements of a computer are a processor 118 for performing actions in accordance with instructions and one or more memory devices for storing instructions and data. Generally, a computer will also include, or be operatively coupled to receive, data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor 118 and the memory 128 can be supplemented by, or incorporated in, special purpose logic circuitry.

One or more business applications 120 and a log federation application 122 are executed at the server 115. In particular, business applications 120 may be any software/computer program including instructions for implementing one or more business processes and generating corresponding business process logs. Log federation application 122 may be a software/computer program including instructions for federating process logs generated by different business applications 120 and/or across different business systems. A software/computer program may be written in any form of programming language, including compiled or interpreted languages, declarative or procedural languages, and it can be deployed in any form, including as a stand-alone program or as a module, component, subroutine, object, or other unit suitable for use in a computing environment. A software/computer program may, but need not, correspond to a file in a file system. A software/program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A software/computer program can be deployed to be executed on one computer or on multiple computers that are located at one site or distributed across multiple sites and interconnected by a communication network 140.

The server 115 includes a master process registry 124. A process registry 124 may provide information including realized business process chains and/or federated processes within different business systems on a metadata level. In some implementations, the master process registry is called an E2E process registry. The master process registry 124 may be a registry in communicable condition with all the business systems in the example environment 100. In some implementations, the master process registry 124 may be a database that includes a set of database tables which store information per process definition and logical system in which the process definition is active. The information stored in the database may include: (1) Assigned realized process chain definition identification(s); (2) Potential inbound and outbound integration point types and identifications; and (3) Calling relationship between the business processes per realized process chain definition. The master process registry 124 may be updated when a process definition is activated or updated. The update may be done in an overwrite mode, i.e., old registry entries if exist are replaced by new entries. In some instances, the master process registry 124 is updated by the use of an application programming interface (API) (not shown). Via this API, the process registry 124 may provide for a given process definition a list of other processes which are also part of the realized process chains the given process is assigned to (according to the maintained data of the business process in the process registry 124). The output may include the integration points of those processes. A filtering may take place if one or more integration points (e.g., type, identification) with direction are provided as input to those business processes which utilize the same integration point as counterparts. In some implementations, a process registry may be remote to any of the business systems 110, 150, 180 in the illustrated environment 100. A business process expert may perform E2E process log federation from a central context based on the information stored in the remote process registry.

The illustrated server 115 may also have a GUI 126 comprising a graphical user interface operable to interface with at least one application for any suitable purpose, including generating a visual representation of at least a portion of an E2E business process log, or an individual business process log. Generally, through the GUI 118, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 126 can represent any graphical user interface, including but not limited to, a web browser, touch screen, or command line interface (CLI) that processes information in environment 100 and efficiently presents the information results to the user. In general, the GUI 126 may include a plurality of user interface elements, some or all associated with the business applications 120 and the log federation application 122, such as interactive fields, pull-down lists, and buttons operable by a business process expert. These and other user interface elements may be related to or represent the functions of the applications, as well as other software applications executing at the server 115.

The server 115 further includes a memory 128. In general, memory 128 may include any memory or database module and may take the form of volatile or non-volatile memory including, without limitation, magnetic media, optical media, random access memory (RAM), read-only memory (ROM), removable media, or any other suitable local or remote memory component. Memory 128 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 115 and its one or more hosted applications. Additionally, memory 128 may include any other appropriate data, such as VPN applications, firmware logs and policies, firewall policies, a security or access log, print or other reporting files, as well as others. In the illustrated example 100, The memory 128 includes a business process repository 130 for storing information associated with one or more business processes 120, an application repository 132 for storing the hosted applications of the server 115, and a process log data repository 134 for storing process logs generated by the hosted applications.

As shown in FIG. 1, the server 115 also includes an interface 136. The interface 136 is used by the server 115 for communicating with other business systems in the illustrated example environment 100 through a network 140. Generally, the interface 136 includes logic encoded in software and/or hardware in a suitable combination and operable to communicate with the network 140. More specifically, the interface 136 may comprise software supporting one or more communication protocols associated with communications such that the network 140 or interface's hardware is operable to communicate physical signals within and outside of the illustrated environment 100. In some instances, the interface's hardware may include wireless transceivers and antenna (not shown). The wireless transceivers can include both the transmitter circuitry and the receiver circuitry. The wireless transceivers may be responsible for up-converting a baseband signal to a passband signal or vice versa. The components of wireless transceivers may include a digital to analog converter/analog to digital converter, amplifier, frequency filter and oscillator. The antenna is a transducer which can transmit and/or receive electromagnetic waves. The antenna can convert electromagnetic radiation into electric current, or vice versa. The antenna is generally responsible for the transmission and reception of radio waves, and can serve as the interface between the transceiver and the wireless channel.

The server 115 may be communicably coupled to an output device, (e.g., a display 138) that conveys information associated with the operation of the server 115 (e.g., a process log presented through a GUI 126. The display 138 may be used for presenting one or more E2E business process logs for business process monitoring, and/or one or more components business process logs for the log federation by a business process expert.

It will be understood that besides the server 115 and the display 138, business system A 110 may include other components that are suitable for any business implementation without departing from the scope of the disclosure.

Business system A 110 is communicably coupled to business system B 150, and/or other business systems 180 through a network 140. Generally, the network 140 facilitates wireless or wireline communications between the devices operated in the environment 100, as well as with any other local or remote devices communicably coupled to the network 140 but not illustrated in FIG. 1. The network 140 is illustrated as a single network in FIG. 1, but may be a continuous or discontinuous network without departing from the scope of this disclosure, so long as at least a portion of the network may facilitate communications between senders and recipients. The network 140 may be all or a portion of an enterprise or secured network, while in another instance, at least a portion of the network 140 may represent a connection to the Internet. In some instances, a portion of the network 140 may be a virtual private network (VPN), such as, for example, the connection between business system A 110 and business system B 150. Further, all or a portion of the network 140 can comprise either a wireline or wireless link. Example wireless links may include 802.11a/b/g/n, 802.20, WiMAX, Bluetooth and/or any other appropriate wireless link. In other words, the network 140 encompasses any internal or external network, networks, sub-network, or combination thereof operable to facilitate communications between various computing components inside and outside the illustrated environment. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

In the illustrated example environment 100, business system B 150 includes a computer 155. The computer 155 accommodates software and hardware components including a processor 158, one or more business applications 160, a log federation application 162, a local process registry 164, a GUI 166, an interface 168 and a memory 170. In general, the computer 155 can be any electronic computer device operable to receive, transmit, process, and store any appropriate data associated with the environment 100 of FIG. 1. It will be understood that there may be any number of computers 155 associated with, or external to, business system B 150. As used in this disclosure, computer 155 is intended to encompass a personal computer, touch screen terminal, workstation, network computer, server, one or more processors within these or other devices, or any other suitable processing device. For example, each computer 155 may include an input device, such as a keypad, touch screen, mouse, or other device that can accept user information, and an output device, (e.g., a display) that conveys information associated with the operation of the computer 155 itself, including digital data, visual information, business applications 160, log federation application 162 or the GUI 166. Both the input and output device may include fixed or removable storage media such as a magnetic storage media, CD-ROM, or other suitable media to both receive input from and provide output to users and/or present the output on the display.

In some implementations, the software and hardware components included in the computer 155 may have functionalities that are similar or different in nature to that of their respective counterpart included in the server 115. In some instances, the process registry included in the computer is a local process registry 164, i.e., the local process registry 164 may not have access to integration points and/or business definitions stored in business systems other than business system B 150. When the registry included in the computer 155 is a local business registry 164, the log federation application 162 may only be able to orchestrate process logs generated by business processes executed on business system B 150. The illustrated memory 170 included in business system B 150 includes a business process repository 172 and an application repository 174. In some instances, the memory 170 may also include a process log data warehouse (not shown) to store process logs generated by business processes on business system B 150.

It will be understood that besides the computer 155, business system B 150 may include other components that are suitable for any business implementation without departing from the scope of the disclosure.

The example system environment 100 may also include other business systems 180 operable to implement business processes similar or different in nature to that of business system A 110 and/or business system B 150. An E2E business process may include business processes executed on business system A 110, business system B 150, other business systems 180, or any combination thereof.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
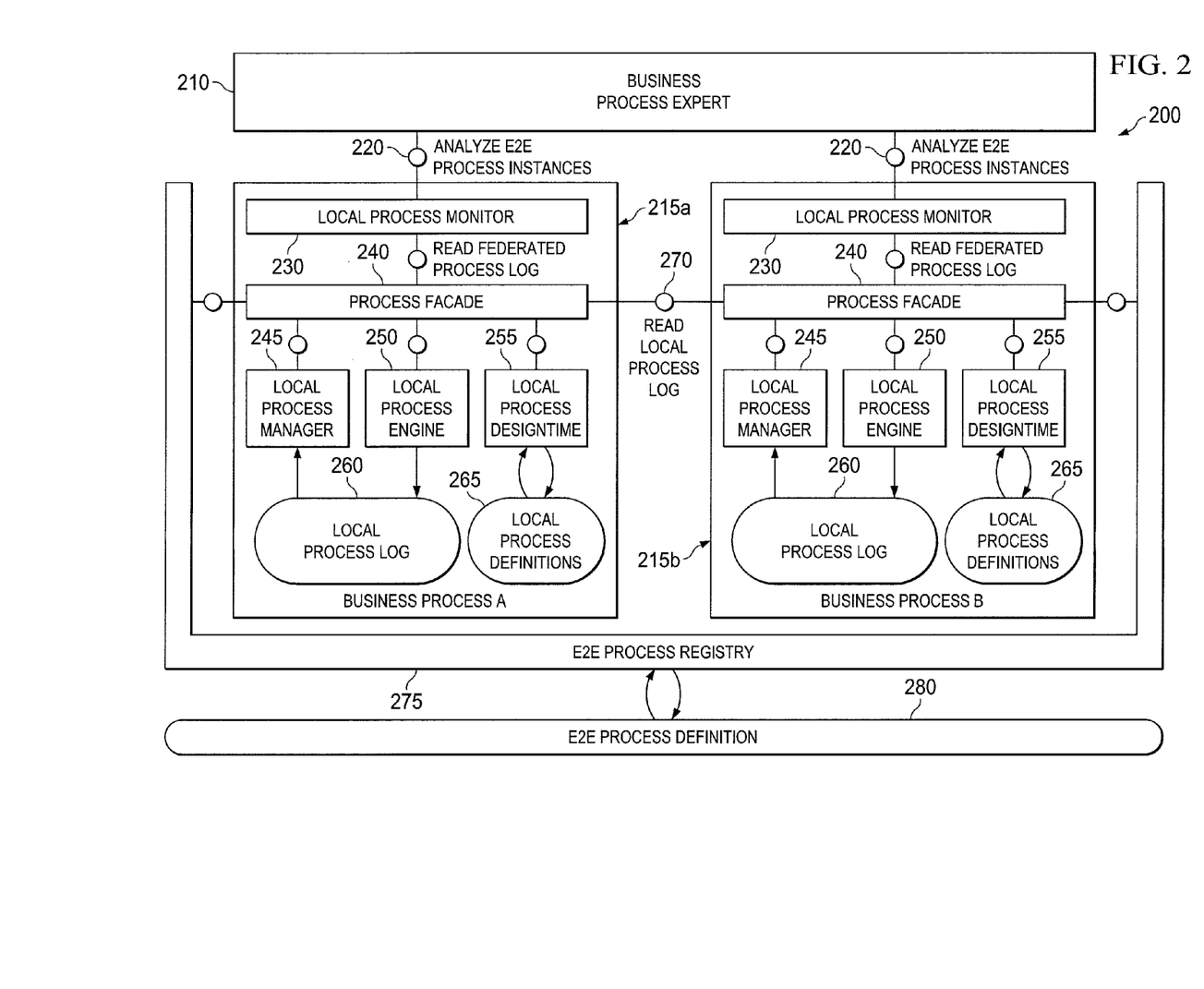
FIG. 2 is a block diagram illustrating an example architecture for process log federation.

FIG. 2 is a block diagram illustrating an example architecture 200 for process log federation. At a high level, the example architecture 200 includes a business process expert 210, business application unit A 215a, business application unit B 215b, and an E2E process registry 275. The business process expert 210 may be a person or an electronic device that monitors business processes. In some instances, the business process expert 210 may be associated with a client system interacting with one or both of the business applications units 215. The business process expert 210 may also be responsible for initiating, analyzing, and/or orchestrating business process logs to generate a federated E2E process log.

Business application units 215 may be computing units for executing business/network applications. Business application unit A 215a and business application unit B 215b may execute different business/network applications. For example, business application unit A 215a may execute a customer relationship management application, and business application unit B 215b may execute an enterprise management application. Business application unit A 215a and business application unit B 215b may be included in the same or different business system. When business application unit A 215a and business application unit B 215b are included in the same business system, the E2E process registry 275 may be either a local process registry 164 or a master process registry 124 as described in the illustration of FIG. 1, and the log federation may also be called a local process log federation. When the business application unit A 215a and business application unit B 215b are included in different business systems, the E2E process registry 275 may be a master process registry.

Each of the illustrated business application units 215 includes a local process monitor 230, a process façade 240, a local process manager 245, a local process engine 250, a local process design-time unit 255, a local process log 260, and one or more local process definitions 265. Line 220 illustrates that the business process expert 210 can analyze one or more E2E process instances by reading information from the local process monitor 230. The local process monitor 230 may include or provide a user interface that presents a view for business processes and/or business process logs operated on the business application units 215. The information presented by the local process monitor 230 may be read from a process façade 240, which can provide a normalized interface for business processes and/or process logs generated using different types/levels of applications. The process façade 240 may also be communicably coupled to the E2E process registry, and the process façade included in other business application units. The process façade 240 may read local process log 270 that is associated with the same E2E business process from other business application unit. Local process manager 245, local process engine 250, and local process design-time 255 are infrastructures for local process log 260 orchestration. Local process definitions 265 may be used by the infrastructures to create local process log 260. The local process definitions 265 may store information descriptive of how the local process definition is related to an E2E process definition 280, and/or the integration point(s) of the local business process with other local business processes on the same or different business systems. The E2E process definition 280 may be stored in or communicably coupled to the E2E process registry 275. The E2E process definition 280 may store information including integration points and identification information of one or more E2E business processes executed by multiple business applications and/or multiple business systems.

Figure 3:
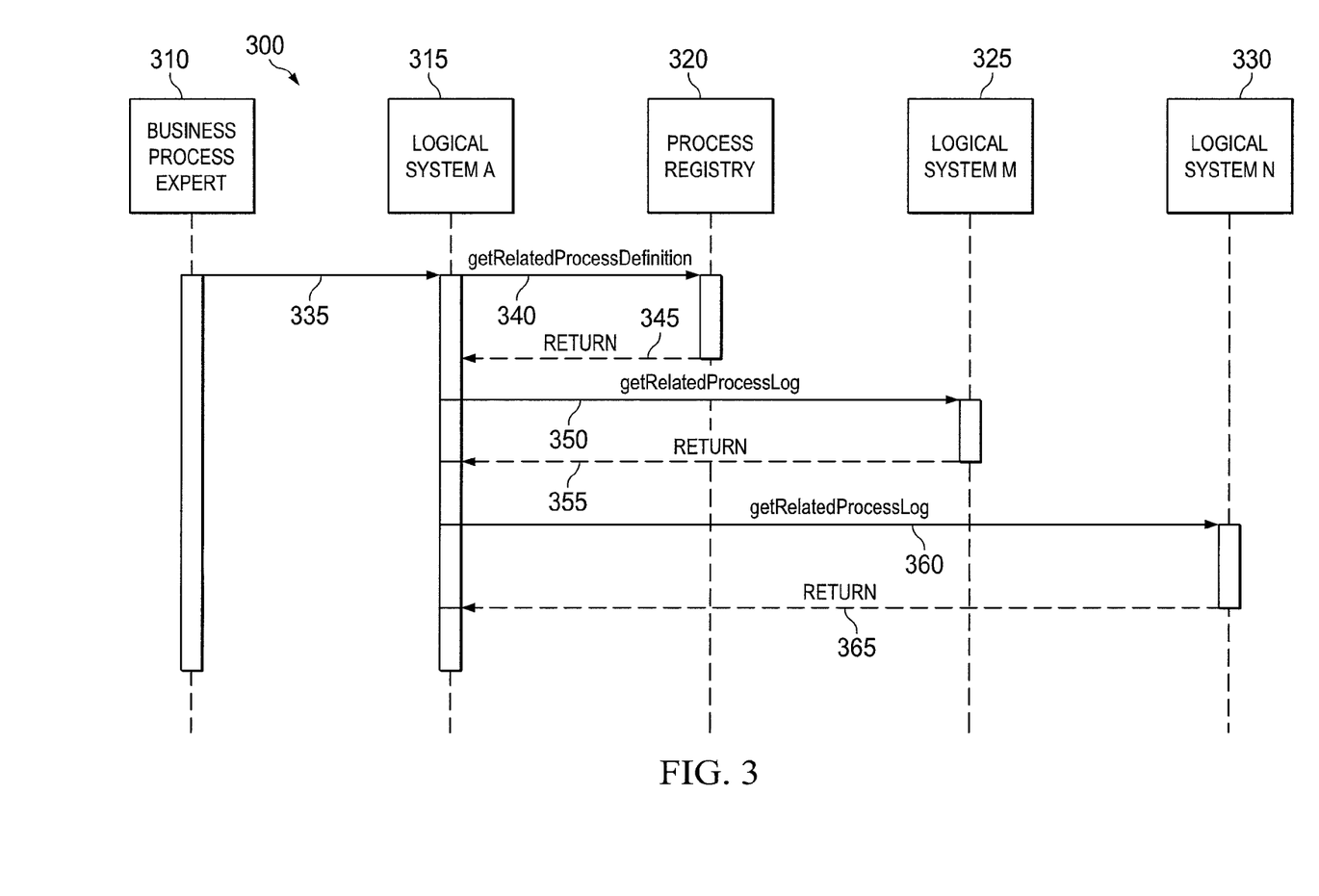
FIG. 3 is a swim lane diagram illustrating an example process for process log federation.

FIG. 3 is a swim lane diagram illustrating an example process 300 for process log federation. The example process 300 is implemented by a business process expert 310, logical system A 315, a process registry 320, logical system M 325 and logical system N 330. In this example, the log federation process starts from logical system A. At 335, a business process expert 310 identifies an instance of a local process log associated with an E2E business process. Identifying the instance of the local process log associated with an E2E business process may include various actions, including the business process expert 310 affirmatively identifying a particular local process or local process instance and requesting process log federation. In other instances, reviewing a local process log instance for a particular system or application may automatically result in an attempt to federate a process log associated with an E2E business process. Other suitable methods for initiating the creation of a federated process log may also be employed.

At 340, the logical system A 315 sends a "getRelatedProcessDefinition" command to the process registry 320 to retrieve related process definitions. The local process log may be generated by a local business process which may be a component of any part of the E2E business process. At 345, the process registry returns information to logical system A 315 including a list of local processes and their logical systems associated with the E2E business process and one or more integration points. Based on the logical system and integration points returned from the process registry, logical system A 315 may identify logical system M 325 executing a business process that is also part of the E2E business process. The identified local process log executed by, maintained by, or located at logical system M 325 may be associated with communication identifications that are shared by two or more of the local process logs that form the E2E process log for the E2E business process. The integration points may be used to identify how to concatenate or otherwise combine local process logs from two or more systems to form or create an E2E process log. After identifying the local process logs associated with the E2E business process, logical system A 315 sends a "getRelatedProcessLog" command with the communication identifications as data or parameters to logical system M 325 at 350, and, in response to command, logical system M 325 may return the identified local process logs associated with the E2E business process at 355. Similarly, logical system A 315 may also send a "getRelatedProcessLog" command to logical system N 330 at 360, and receive a returned local process log from logical system N 330 at 365. The executions of sending the "getRelatedProcessLog" commands to logical system M 325 and logical system N 330 may be performed either in serial or in parallel, allowing for information related to a plurality of local process logs associated with other E2E-related systems to be collected concurrently. In some instances, logical system A 315, M 325 and N 330 may be a portion of all the systems involved to perform the E2E business process. As such, the federated E2E process log generated may be a portion of the entire E2E process log. Additional systems other than those illustrated may also be contacted using similar or other suitable operations as described in method 300.

Figure 4:
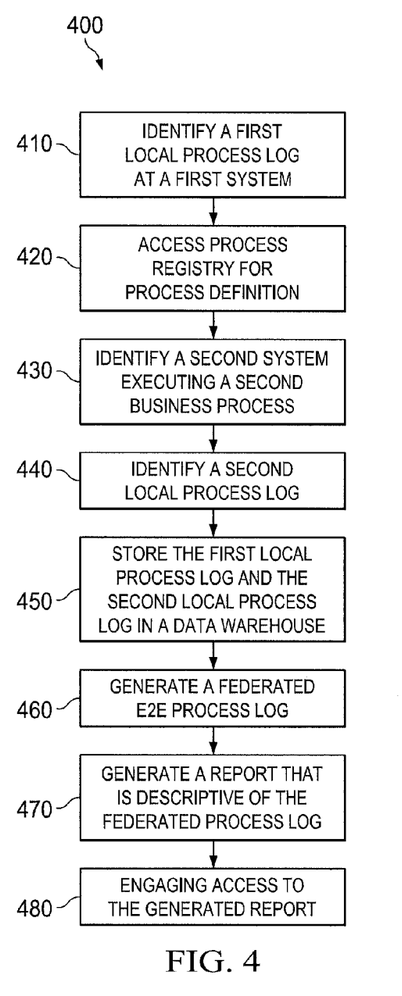
FIG. 4 is a flowchart illustrating an example process for process log federation from a local context.

FIG. 4 is a flowchart illustrating an example process 400 for process log federation from a local context. The example process 400 may be executed using a computer program product (e.g., the log federation application 122, 162 described in the illustration of FIG. 1) by a computing device or a business process expert. At 410, a first local process log at a first system is identified. The first system may be a business system 110, 150 described in the illustration of FIG. 1 or any logical system that is operable to perform business processes. The process log may be generated by a local business process that is a part of any portion of an E2E business process running on the first system or across different business systems. In some instances, the first local process log includes information associated with an identification, and identifying the first local process log also includes identifying said identification. The identification may be associated with the E2E business process for log federation. In some instances, when the E2E business process is executed on a single business system, the identification may be called a business object identification, in some instances relating operations associated with one or more business objects executing in the business system. When the E2E business process is executed on multiple business systems, process communication takes place between the different local processes in multiple systems. Each communication between two local processes in different systems is associated with a communication identification, which may, F, in some instances, be related to messages, information, and other communications passed between the multiple business systems.

At 420, a process registry for process definition is accessed. The process definition (or portion thereof) stored in the registry may include identifications of a plurality of local business process, E2E business processes, and, optionally, local process log information. In some instances, the process definition may describe the communication and interaction between two or more business processes or events associated with a local or E2E business process. The process definition may also include one or more integration points. In some implementations, the one or more integration points can be used for integrating at least two local process logs to generate at least a portion of federated E2E business log. By accessing the process definition stored in the process registry, an E2E business process that has the same integration points as, or is identified as being associated with, the first local process log may be identified. At 430, a second system executing a second business process associated with the E2E business process is identified based at least in part on the process registry and its process definition. The second system executing the second business process may be identified based on the integration points or business object types that are common to or linked between the first and second system and the process definition. The second system may also be identified based on another relevant description or association described within or referenced by the process registry. In some instances, the first system and the second system are the same, and the process registry may be either a local process registry or a master process registry. When the first system and the second system are different, the process registry is a master process registry. At 440, a second local process log is identified. The second process log may be generated by the second business process and is associated with the second business process. In some instances, the second local process log may be identified within the process registry, while in others, the second local process log may be identified based on an identification of the second business process and subsequent search or retrieval of the process log associated therewith.

At 450, the first local process log and the second process log may be stored in a data warehouse. In some implementations, storing the first local process log and the second process log in a data warehouse may be an optional step. The data warehouse may be the data warehouse included in the memory 128, 170 described in the illustration of FIG. 1. In some instances, the first business process and the second business process may be parts of more than one E2E business process. After storing the first local process log and the second process log in a data warehouse, the first local process log and the second local process log may be retrieved for any of the more than one E2E business process log federation. While in other implementations, the first local process log and the second local process log may be directly read by the computer program product (e.g., a log federation application 122, 162 described in the illustration of FIG. 1) from their respective local business system without storing to the same data warehouse.

At 460, a federated E2E process log is generated. The federated E2E process log may be generated based on combining some or all of the identified first and second process logs corresponding to the matching integration points and their related communication identifications or business object identifications. In some instances, when a local process log for an E2E business process is associated with only one integration point, the corresponding business process may be the beginning or the end part of the E2E business process. Otherwise, the local process log may correspond to a business process comprising a middle, or intermediate, part of the E2E business process. In some instances, the E2E business process may include only the first business process and the second business process. As such, the federated process log is a process log of the entire E2E business process. Otherwise, the federated process log is a portion of the entire E2E business process log. In some implementations, a third local process log associated with the E2E business process on a third system may be identified using a similar method as described above for identifying the second local process log. Then the first, second and third local process log may be federated to generate at least a portion of the E2E process log.

At 470, a report that is descriptive of the federated process log is generated. After a federated process log is generated for at least a portion of an E2E business process, it may be presented via a user interface (such as the GUI 126 as described in the illustration of FIG. 1) on a display to a business process expert or other business system users for monitoring the E2E business process. In some instances, the generated report is not displayed but stored in a memory. At 480, access to the generated report by the first system or the second system is engaged, such that any user operating in the first system or the second system that has been engaged may have access to view and/or editing the report.

Figure 5:
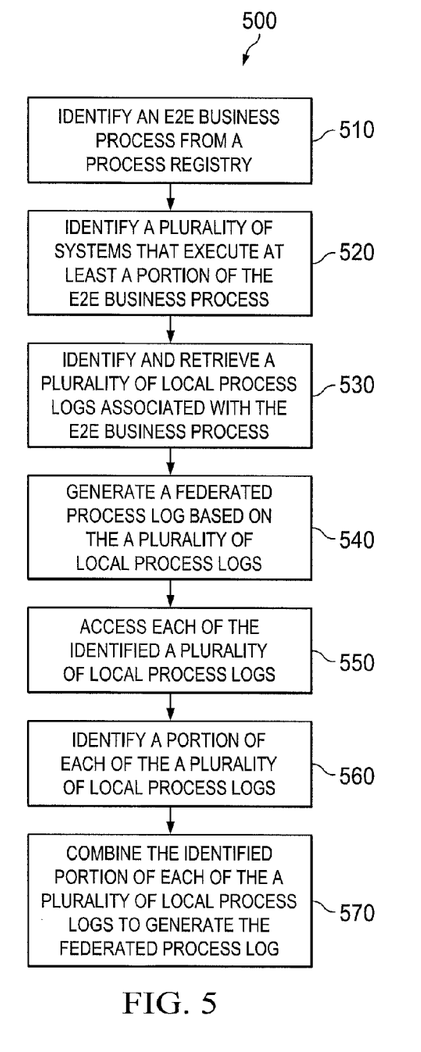
FIG. 5 is a flowchart illustrating an example process for process log federation from a central context.

FIG. 5 is a flowchart illustrating an example process 500 for process log federation from a central context. At 510, an E2E business process is identified from a process registry. Identifying the E2E business process from the process registry may also identify the E2E business process for log federation. At 520, a plurality of systems that execute at least a portion of the E2E business process are identified. The identification of a plurality of systems may be based on a process definition of the E2E business process within the process registry. As described above, the process definition may include an identification and one or more integration points for each local business process. Identifying the plurality of systems may be based on the local business processes executed on the plurality of systems that have the same identification as the E2E business process, and/or matching integration points. The number of systems identified may depend on the definition information available in the process registry, or the local business process in interest. For example, if a process registry is not communicably coupled to a business system, even if the business system performs a part of the business process for the E2E business process, the business process log stored in the business system may be able to be identified.

At 530, a plurality of local process logs associated with the E2E business process for the plurality of systems are identified and retrieved. At 540, a federated process log is generated based on the retrieved plurality of local process logs. At 550, each of the identified plurality of local process logs is accessed. In some implementations, only a portion of the business log (e.g., process log segment related to a specific operation of the E2E business process) for each local business process are of interest. As such, at 560, a portion of each of the plurality of local process logs relevant to the E2E business system may be identified. At 570, the identified portion of each of the plurality of local process logs are combined to generate the federated process log.

Figure 6:
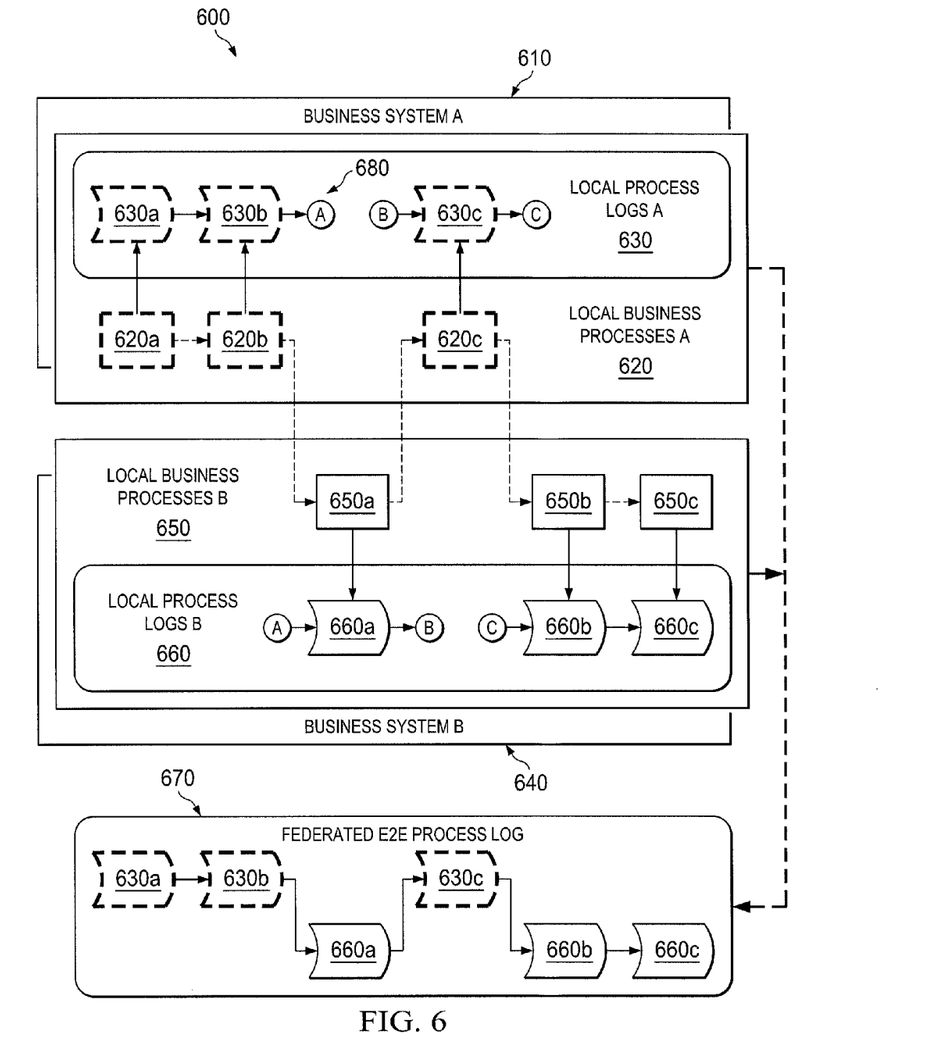
FIG. 6 is a schematic illustrating an end-to-end process log federation example.

FIG. 6 is a schematic illustrating an E2E process log federation example 600. In the illustrated example 600, there are two business systems that collaborate to perform at least a portion of an E2E business process. Local business processes A 620 comprises the business process executed on business system A 610. Local process logs A 630 are the business process logs generated by local business processes A 620. Similarly, local business processes B 650 comprise the business process executed on business system B 640. Local process logs B 660 are the business process logs generated by local business processes B 650. More specifically, local business processes A 620 includes three local business processes 620a, 620b and 620c that respectively generate local process logs 630a, 630b and 630c. In the particular example 600, the workflow of the at least a portion of the E2E business process is from 620a, via 620b, 650a, 620c, 650b, to 650c. Process logs 630a and 630b may have already been federated or they may not need to be federated since their corresponding business processes 620a and 620b are with the same type or executed by the same application. In FIG. 6, the small circle 680 may represent an identification and/or an integration point. During an E2E process log federation procedure, the identification and/or integration point 680 associated with 630b may be identified to match one of the identifications and/or integration points associated with 660, by an business process expert or a log federation related application. Additionally, the identification and/or integration point 680 associated with a particular interaction may be recorded in each of the local process logs 630 and 660, such that a connection between the business processes is included in each of the process logs to allow for easier correlation. Therefore, local process log 630b in business system A 610 and local process log 660b in business system B 640 may be concatenated or combined, as appropriate. Similarly, local process log 660a may be concatenated with local process log 630c, and local process log 630c may further be concatenated with local process log 660b. By combining local process logs A 630 and local process logs B 660 based on identifying matching identifications and/or integration point 680, the local process logs are orchestrated to generate a federated E2E process log 670. In some instances, only a portion of the data stored in the process logs may be relevant to a particular E2E business process. In those instances, only the relevant portions of the process logs may be used when generating the federated E2E process log 670.

While this specification contains many specific implementation details, these should not be construed as limitations on the scope of any that may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based at least in part on one or more other items or operations and may be based exclusively, partially, primarily, secondarily, directly, or indirectly on the one or more other items or operations.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A computer-implemented method performed by one or more processors, the method comprising:
    identifying a first local process log of a first business process executing locally at a first system, wherein the first business process comprises a first portion of an end-to-end business process associated with at least two related and distinct business processes, each business process associated with a corresponding local process log;
    accessing a process registry to identify a second system executing a second business process associated with the end-to-end business process, the process registry identifying a set of inbound and outbound integration points associated with the end-to-end business process and at least the first and second business processes;
    identifying a second local process log of the second business process executing locally at the second system, the second local process log stored apart from the first local process log, wherein the second business process comprises a second portion of the end-to-end business process, and wherein identifying the second local process log includes identifying at least a first integration point associated with the first local process log and at least a corresponding second integration point associated with the second local process log; and
    generating a federated end-to-end process log based on a combination of at least a portion of the identified first local process log and at least a portion of the identified second local process log, wherein the combination of the portion of the first local process log and the portion of the second local process log is based on concatenating the portion of the first local process log associated with the first integration point and the portion of the second local process log associated with the corresponding second integration point.

2. The method of claim 1, wherein the first system and the second system are remote to each other, the process registry comprises at least a portion of an end-to-end process registry communicably coupled to at least the first system and the second system.

3. The method of claim 1, further comprising storing at least a portion of the federated process log in a data repository.

4. The method of claim 1, wherein the process registry stores at least a portion of a definition of at least one end-to-end process, and the definition includes an identification for passing communications between the at least two business processes.

5. The method of claim 1, wherein the federated end-to-end process log is a process log for the entire end-to-end business process.

6. The method of claim 1, wherein the federated process log is a process log for a portion of the entire business process, and the method further comprising:
    accessing the process registry to identify a third system executing a third business process associated with the end-to-end business process;
    identifying a third local process log of the third business process executing locally at the third system, where the third business process comprises a third portion of the end-to-end business process; and
    generating a federated process log based on a combination of at least a portion of the identified first local process log, at least a portion of the identified second local process log, and at least a portion of the identified third local process log.

7. A computer-implemented method performed by one or more processors, the method comprising:
    identifying, from a process registry, an end-to-end business process associated with at least two related and distinct business processes, each business process associated with a corresponding local process log, wherein the process registry identifies a plurality of inbound and outbound integration points associated with the at least two business processes;

identifying a plurality of systems that execute at least a portion of an instance of the end-to-end business process based on a definition of the end-to-end business process within the process registry;

identifying a plurality of local process log instances associated with the instance of the end-to-end business process for the plurality of systems as defined by the process registry, wherein identifying the plurality of local process log instances includes identifying at least a first local process log and a second local process log, the first local process log associated with a first integration point within the process registry, and the second local process log associated with a second integration point within the process registry, the second integration point corresponding to the first integration point; and generating a federated end-to-end process log based on a combination of at least a portion of each of the plurality of local process logs including at least a portion of the first and second local process logs, wherein the combination of the portion of the first and second local process logs is based on concatenating a related pair of integration points from the first local process log and the second local process log.

8. The method of claim 7, wherein generating a federated process log further comprising:

accessing each of the plurality of local process logs associated with the end-to-end business process;

identifying a portion of each of the plurality of local process logs relevant to the end-to-end business process; and combining the identified portion of each of the plurality of local process logs to generate the federated process log.

9. The method of claim 7, further comprising:

generating a report that is descriptive of at least a portion of the generated federated end-to-end process log; and engaging access to the at least a portion of the generated report descriptive of the federated process log by at least one of the plurality of systems.

10. A computer program product for federating local process logs, the computer program product comprising computer readable instructions embodied on tangible, non-transitory media, the instructions operable when executed to:

identify a first local process log of a first business process executing locally at a first system, wherein the first business process comprises a first portion of an end-to-end business process associated with at least two related and distinct business processes, each business process associated with a corresponding local process log;

access a process registry to identify a second system executing a second business process associated with the end-to-end business process, the process registry identifying a set of inbound and outbound integration points associated with the end-to-end business process and at least the first and second business processes;

identify a second local process log of the second business process executing locally at the second system, the second local process log stored apart from the first local process log, wherein the second business process comprises a second portion of the end-to-end business process, and wherein identifying the second local process log includes identifying at least a first integration point associated with the first local process log and at least a corresponding second integration point associated with the second local process log; and generate a federated end-to-end process log based on a combination of at least a portion of the identified first local process log and at least a portion of the identified second local process log, wherein the combination of the portion of the first local process log and the portion of the second local process log is based on concatenating the portion of the first local process log associated with the first integration point and the portion of the second local process log associated with the corresponding second integration point.

11. The computer program product of claim 10, wherein the first system and the second system are remote to each other, the process registry comprises at least a portion of an end-to-end process registry communicably coupled to at least the first system and the second system.

12. The computer program product of claim 10, the instructions further operable when executed to store at least a portion of the federated process log in a data repository.

13. A computer program product for federating local process logs, the computer program product comprising computer readable instructions embodied on tangible, non-transitory media, the instructions operable when executed to:

identify, from a process registry, an end-to-end business process associated with at least two related and distinct business processes, each business process associated with a corresponding local process log, wherein the process registry identifies a plurality of inbound and outbound integration points associated with the at least two business processes;

identify a plurality of systems that execute at least a portion of the end-to-end business process based on a definition of the end-to-end business process within the process registry;

identify a plurality of local process logs associated with the end-to-end business process for the plurality of systems as defined by the process registry, wherein identifying the plurality of local process log instances includes identifying at least a first local process log and a second local process log, the first local process log associated with a first integration point within the process registry, and the second local process log associated with a second integration point within the process registry, the second integration point corresponding to the first integration point; and generate a federated end-to-end process log based on a combination of at least a portion of each of the plurality of local process logs including at least a portion of the first and second local process logs, wherein the combination of the portion of the first and second local process logs is based on concatenating a related pair of integration points from the first local process log and the second local process log.

14. The computer program product of claim 13, wherein generating the federated end-to-end process log further comprising:

accessing each of the plurality of local process logs associated with the end-to-end business process;

identifying a portion of each of the plurality of local process logs relevant to the end-to-end business process; and combining the identified portion of each of the plurality of local process logs to generate the federated process log.

15. The computer program product of claim 13, the instructions further operable when executed to:

generate a report that is descriptive of at least a portion of the generated federated process log; and engage access to the at least a portion of the generated report descriptive of the federated process log by at least one of the a plurality of systems.

16. A system comprising:

at least one memory operable to store a process registry defining an end-to-end business process associated with at least two business processes; and a processor coupled to the at least one memory operable when executed to:

identify a first local process log of a first business process executing locally at a first system, wherein the first business process comprises a first portion of the end-to-end business process associated with at least two related and distinct business processes, each business process associated with a corresponding local process log;

access the process registry to identify a second system executing a second business process associated with the end-to-end business process, the process registry identifying a set of inbound and outbound integration points associated with the end-to-end business process and at least the first and second business processes;

identify a second local process log of the second business process executing locally at the second system, the second local process log stored apart from the first local process log, wherein the second business process comprises a second portion of the end-to-end business process, and wherein identifying the second local process log includes identifying at least a first integration point associated with the first local process log and at least a corresponding second integration point associated with the second local process log; and generate a federated end-to-end process log based on a combination of at least a portion of the identified first local process log and at least a portion of the identified second local process log, wherein the combination of the portion of the first local process log and the portion of the second local process log is based on concatenating the portion of the first local process log associated with the first integration point and the portion of the second local process log associated with the corresponding second integration point.

17. A system comprising:

at least one memory operable to store a process registry associated with at least one end-to-end business process, each end-to-end business process including at least two business processes; and a processor coupled to the at least one memory operable when executed to:

identify, from the process registry, a particular end-to-end business process associated with at least two related and distinct business processes, each business process associated with a corresponding local process log, wherein the process registry identifies a plurality of inbound and outbound integration points associated with the at least two business processes;

identify a plurality of systems that execute at least a portion of an instance of the particular end-to-end business process based on a definition of the particular end-to-end business process within the process registry;

identify a plurality of local process log instances associated with the instance of the particular end-to-end business process for the plurality of systems as defined by the process registry, wherein identifying the plurality of local process log instances includes identifying at least a first local process log and a second local process log, the first local process log associated with a first integration point within the process registry, and the second local process log associated with a second integration point within the process registry, the second integration point corresponding to the first integration point; and generate a federated end-to-end process log based on a combination of at least a portion of each of the plurality of local process logs including at least a portion of the first and second local process logs, wherein the combination of the portion of the first and second local process logs is based on concatenating a related pair of integration points from the first local process log and the second local process log.

* * * * *